(No Model.)
J. PARKER.
APPARATUS FOR MIXING LIQUIDS AND FLUIDS.
No. 540,270. Patented June 4, 1895.
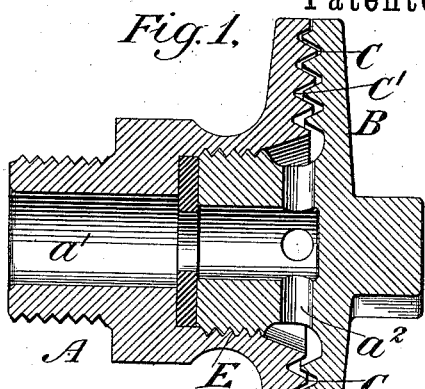
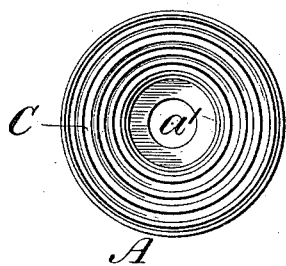
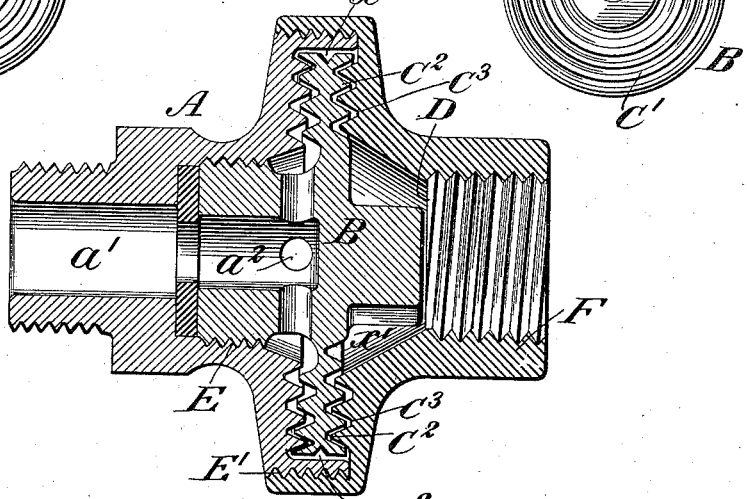
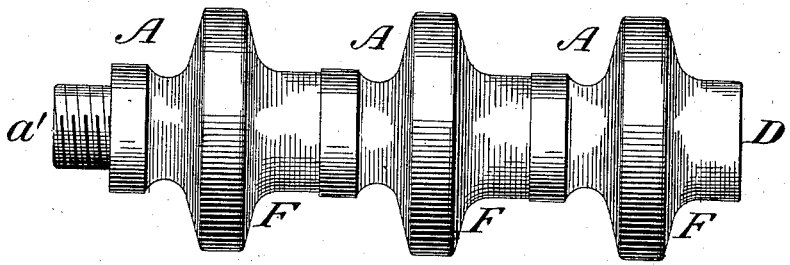
WITNESSES:
INVENTOR
John Parker
BY Philip Hathaway
ATTORNEY

UNITED STATES PATENT OFFICE.

JOHN PARKER, OF BROOKLYN, NEW YORK, ASSIGNOR OF ONE-HALF TO PHILIP SPITZENBERG, OF SAME PLACE.

APPARATUS FOR MIXING LIQUIDS AND FLUIDS.

SPECIFICATION forming part of Letters Patent No. 540,270, dated June 4, 1895.

Application filed April 3, 1895. Serial No. 544,275. (No model.)

*To all whom it may concern:*

Be it known that I, JOHN PARKER, a subject of the Queen of Great Britain and Ireland, and a resident of the city of Brooklyn, in the State of New York, have invented new and useful Improvements in Apparatus for Mixing Liquids and Fluids, of which the following is a specification.

The object of my invention is to provide an improved apparatus for mixing and incorporating liquids and fluids, and especially for use in the manufacture of mineral waters and other carbonated beverages where it is required to effect the most intimate incorporation of carbonic acid gas with water or other liquids, but my invention is also adapted for and can be used in the mixing and incorporating of other liquids and fluids, and especially for the incorporation of gases with liquids.

The value of my invention and its method of application are shown in the following specification and drawings, in which—

Figure 1 is a sectional view of the apparatus in its single form closed and ready for use. Figs. 2 and 3 show end views of the two halves or sections of the apparatus when opened, showing the corrugated surfaces by which the mixing process is effected. Fig. 4 is a modification of Fig. 1, showing section of double form of my apparatus. Fig. 5 is an elevation of the double apparatus shown in Fig. 4 closed and ready for use.

In the above figures, A. is the lower or inlet section of the apparatus. B. is the upper or exit section of same.

$a'$. is the inlet for reception of the liquids to be mixed or blended, or for reception of the water and carbonic acid gas from the pump or other source of supply in a soda water apparatus.

$a^2$. are apertures or ports in the upper end of the inlet $a'$.

C. C'. are a series of ridges and grooves arranged preferably in concentric form in the corresponding faces of the sections A. and B.

D. is the exit pipe in the double apparatus shown in Figs. 4 and 5.

E. is a screw connection between sections A. and B.

F. is a cap placed over the upper section B. in the double apparatus shown in Figs. 4 and 5.

E'. is a screw connection connecting the cap F. with the lower section A.

$C^2$. $C^3$. are a series of ridges and grooves on the corresponding faces of the section B. and the cap F. in Fig. 4.

$x$. is the point at which the blended fluids escape after passing between the ridges and grooves or corrugations C. C'. in the single apparatus shown in Fig. 1.

$x'$. is the point at which such blended fluids pass into the exit pipe D. in the double apparatus shown in Fig. 4.

$x^2$. is a channel through which the blended fluids pass from one set of ridges and grooves C. C'. to the other set $C^2$. $C^3$. in the double apparatus shown in Fig. 4.

The mode in which I operate my invention is as follows: The fluids to be blended, as for instance water and carbonic acid gas, are forced by any of the usual methods into the inlet pipe $a'$. from which they escape through the ports $a^2$. and are driven by the initial pressure through a series of the narrow spaces or apertures formed by the juxtaposition of the ridges and grooves C. C'. on the corresponding faces of the sections A. and B. The size of these apertures is regulated by the screw connection E., by means of which the distance between A. and B. is governed, and the size of the spaces or apertures between the ridges C. and the grooves C'. increased or diminished at pleasure. The spaces between the ridges and grooves C. C'. are graduated by diminishing the relative height and depth of such ridges and grooves proportionately as they approach the circumference of the sections A. and B. in such proportion as that the total extent of space or opening between the top of each ridge and the bottom of the corresponding groove shall be equal.

In Fig. 1, I have shown a single apparatus furnished with one set of concentric ridges and one corresponding set of concentric grooves, such form of apparatus being intended to be placed in the inside of an ordinary cylinder or fountain in a soda water apparatus. In this case the water and carbonic acid gas are forced through the inlet $a'$. and the ports $a^2$. $a^2$. through the series of fine openings or spaces between the ridges and grooves C. C'., and issues in a finely subdivided form at the point of exit $x$. into the interior of such fountain. It will be easily seen that in such passage the water is necessarily divided and broken up into very small quantities, and an intimate union with the carbonic acid gas which accompanies it in its passage through the fine apertures between the ridges and grooves C. C'. is effected.

In Figs. 4 and 5, I have shown a modification of my apparatus by which a double set of ridges and grooves or corrugations is provided. In this double apparatus the water and gas pass in through the inlet $a'$. between the ridges and grooves C. C'. and the channel $x^2$. to another series of ridges and grooves $C^2$., $C^3$., from which in turn they pass into the exit pipe D. at the point $x'$. In this form of apparatus the second series of ridges and grooves are graduated in the same way as the first series C. C'., so that water and gas in passing from the point $x$. to the exit pipe D. have the same area of escape, and meet with the same amount of resistance, as in passing between the first set of ridges and grooves C. C'. to the point $x$. This form of apparatus is especially adapted for use on the outside of an ordinary soda water fountain or cylinder into which the combined water and gas is conveyed by a pipe leading from the exit pipe D. to the interior of such fountain or cylinder. Where this double form is adopted, the whole apparatus can be conveniently and advantageously placed in a box surrounded by ice, and the absorption of carbonic acid gas by the water thereby greatly increased and facilitated.

I have shown in my drawings a double apparatus with only two sets or series of ridges and corresponding grooves, but it is obvious that any number of such sets can be combined and any required extent of incorporating surfaces be thereby obtained.

Though primarily adapted as stated, for the incorporation of gas and water in the manufacture of mineral waters and other carbonated beverages, my apparatus is equally adapted for use for the mixing and incorporation of other fluids, as for instance, for the blending of water and glycerine or other liquids which require in ordinary methods beating or churning together by mechanical means to effect an intimate union of the particles of such liquids.

When used for blending liquids, the inlet $a'$. can be connected with tanks placed at a suitable elevation and the force necessary for driving the liquids between the ridges and grooves can be conveniently supplied by gravitation.

Having thus described the nature of my invention and how it is operated, what I claim, and desire to secure by Letters Patent, is—

1. Means for mixing or incorporating fluids and liquids consisting substantially of: an inlet pipe for reception of such fluids and liquids; one or more series of hollow spaces or apertures connected with the inlet pipe, and formed by the juxtaposition of two or more corrugated rigid surfaces; means for regulating the distance between such corrugated surfaces, and thereby increasing or diminishing the size of such spaces or apertures; and means for discharging the fluids and liquids after passing between such corrugated surfaces, all substantially as described and for the purposes specified.

2. In an apparatus for mixing and incorporating liquids and fluids, the combination with an inlet or feed pipe and a suitable outlet, of a graduated series of concentric ridges with a graduated series of corresponding concentric grooves placed between the inlet and outlet, and arranged so that the liquids and fluids to be blended will pass through the spaces or apertures formed by the juxtaposition of such ridges and grooves, substantially as described and shown and for the purposes specified.

3. In an apparatus for mixing and incorporating liquids and fluids, the sections A and B provided with the ridges and grooves C, C', placed in juxtaposition so as to leave narrow apertures between such ridges and grooves, in combination with means for regulating the distance between such ridges and grooves consisting of the screw connection E between the sections A and B, in manner described and for the purposes specified.

4. In an apparatus for mixing and incorporating liquids and fluids, the combination of the inlet pipe $a'$, the ports $a^2$, communicating with the inlet pipe, the ridges and grooves C. C'. with spaces between such ridges and grooves communicating with the ports $a^2$., and means for regulating the size of the spaces between the ridges and grooves C. C'. consisting of the screw connection E., substantially as described and for the purposes specified.

5. In an apparatus for mixing and incorporating liquids and fluids, the combination of the inlet pipe $a'$., the ports $a^2$ communicating with the inlet pipe, the sections A. and B. provided with concentric ridges and grooves C. C'. $C^2$. and having spaces between such ridges and grooves communicating with the ports $a^2$., the screw connection E. connecting the sections A. and B., the cap F. placed over the section B. provided with ridges and grooves $C^3$. and connected with the section A., and the exit pipe D. in the cap F. as shown and for the purposes specified.

6. In an apparatus for mixing and incorporating liquids and fluids, the combination of the section A. provided with the inlet pipe $a'$., ports $a^2$. communicating with the inlet pipe $a'$., the graduated concentric ridges and grooves C. C'. on the corresponding faces of sections A. and B., the section B. connected with section A. by screw connection E., the cap F. placed over section B. and connected with section A. by screw connection E'., the graduated concentric ridges and grooves C²., C³. on the corresponding faces of section B. and cap F. and the outlet pipe D, substantially as described and for the purposes specified.

In testimony that I claim the foregoing as my invention I have signed my name, in presence of two witnesses, this 14th day of March, 1895.

JOHN PARKER.

Witnesses:
N. L. TEEPLE,
PHILIP HATHAWAY.